US007923412B1

(12) United States Patent
Kazdin

(10) Patent No.: US 7,923,412 B1
(45) Date of Patent: Apr. 12, 2011

(54) CREATING BACKGROUND COLORS ON THERMAL PRINTING MATERIAL

(76) Inventor: Richard H. Kazdin, Palm City, FL (US)

( * ) Notice: Subject to any disclaimer, the term of this patent is extended or adjusted under 35 U.S.C. 154(b) by 0 days.

(21) Appl. No.: 12/367,964

(22) Filed: Feb. 9, 2009

Related U.S. Application Data

(63) Continuation of application No. 10/999,640, filed on Nov. 26, 2004, now abandoned.

(60) Provisional application No. 60/544,022, filed on Feb. 12, 2004.

(51) Int. Cl.

| | |
|---|---|
| ***B41M 5/20*** | (2006.01) |
| ***B41M 5/24*** | (2006.01) |
| ***B41M 5/40*** | (2006.01) |
| ***B32B 5/16*** | (2006.01) |

(52) U.S. Cl. ........................ 503/226; 428/32.5; 428/204

(58) Field of Classification Search .................. 503/226; 428/32.39, 32.5, 195.1, 199, 201, 203, 204
See application file for complete search history.

(56) References Cited

U.S. PATENT DOCUMENTS

| | | | | |
|---|---|---|---|---|
| 4,151,748 | A * | 5/1979 | Baum | 503/202 |
| 4,273,847 | A | 6/1981 | Lennon et al. | |
| 4,296,176 | A | 10/1981 | Lennon et al. | |
| 4,555,427 | A * | 11/1985 | Kawasaki et al. | 428/195.1 |
| 4,651,177 | A * | 3/1987 | Morishita et al. | 428/32.39 |
| 4,740,495 | A * | 4/1988 | Marinelli et al. | 503/214 |
| 4,778,782 | A * | 10/1988 | Ito et al. | 503/227 |
| 4,948,775 | A * | 8/1990 | Tsuji et al. | 503/207 |
| 5,286,703 | A * | 2/1994 | Wachi et al. | 503/221 |
| 5,644,352 | A * | 7/1997 | Chang et al. | 347/221 |
| 5,898,017 | A * | 4/1999 | Chang | 503/204 |
| 6,294,502 | B1 * | 9/2001 | Fisher et al. | 503/209 |
| 6,352,767 | B1 * | 3/2002 | Kurokawa | 428/32.72 |
| 6,790,477 | B2 | 9/2004 | Allen et al. | |
| 2004/0028880 | A1 * | 2/2004 | Allen et al. | 428/195.1 |

OTHER PUBLICATIONS

Appleton Papers, Inc., Appleton, What Ideas Can Do, Alpha 800-3.4, Alpha 900-3.4, Publication Dte: Jun. 10, 2003.

Appleton Papers, Inc., Appleton, What Ideas Can Do, Alpha 800-3.4, Alpha 900-3.4, Publication Date: Jun. 10, 2003.

* cited by examiner

*Primary Examiner* — Mark Ruthkosky
*Assistant Examiner* — David J Joy
(74) *Attorney, Agent, or Firm* — Lott & Friedland, P.A.

(57) ABSTRACT

A dye ink or a pigmented ink application process using, for example, any one of flexographic printing, flood coating, tinting, or other suitable technique or process to add a colored area adjacent to a thermal ink layer of a thermal material is disclosed. The colored area provides a background color, such that upon application of the heat source, a thermal image appears as being imaged onto the colored area. The process can be used to make heat activated direct thermal labels or thermal paper rolls, including cash register-type rolls, poster printer format rolls, etc. The process permits a thermal material including a thermal ink layer to be produced in various colors in relatively small print runs using conventional equipment.

17 Claims, 1 Drawing Sheet

CREATING BACKGROUND COLORS ON THERMAL PRINTING MATERIAL

This application is a continuation of application Ser. No. 10/999,640 filed Nov. 26, 2004 now abandoned which claims benefit of U.S. Provisional application Ser. No. 60/544,022, filed Feb. 12, 2004, the entirety of the disclosures of which are incorporated herein by reference thereto.

BACKGROUND OF THE INVENTION

This invention relates generally to thermal printing technology, and more specifically to a process of creating background colors in thermal material and the product created thereby, and in particular, to application of the process to produce thermal labels and thermal paper.

Thermal printing is a type of non-impact printing which uses controlled concentrations of heat to develop an image on or in material having a thermal ink deposited thereon. A heated print head is positioned adjacent the thermally coated material, or substrate, which is in most instances paper, in order to cause a desired image to develop on or in the material.

Typically, thermal inks, when dry, appear clear or invisible, but produce an image in a specific color when heated. Thermal inks are typically applied as a one-color selection, meaning images of only one color are produced as the heat source, or heated print head, is applied to the thermally coated material.

If a background color other than white is used in conjunction with a thermal image, the thermal ink is often either coated on top of a colored material, which may have been colored by printing, dying, etc., or mixed with the thermal color ink coating to provide a tinted color background.

Although products are available which produce two colors, such as a black image and a red image, these colors appear as one or the other. Each color is dependent on the heat source developing at a lower temperature vs. a higher temperature. A two color thermally sensitive record material system is disclosed in U.S. Pat. No. 4,151,748.

Turning now to printing techniques, flexographic printing is becoming a common type of printing process in view of letterpress printing. Flexographic printing uses a flexo plate, which is flexible and resilient. The flexographic ink is typically a liquid instead of a paste, and the inking system is straightforward, using a gravure cylinder known as an anilox roll. The anilox roll is inked, wiped clean and transferred onto a raised image area of the flexo plate. The ink remains wet long enough to transfer to the paper or other substrate. Because the flexo plate is resilient, typically made of rubber or photopolymer, it can be impressed against a wide variety of surfaces and can print generally without voids.

Another known printing technique is flood coating, or flooding, which is the printing of a sheet completely with an ink or varnish and involves a process whereby a sponge-like applicator applies a color onto the material.

Tinting paper would screen or add white to a solid color for results of lightening that specific color.

SUMMARY OF THE INVENTION

Generally, the present invention includes a dye resin ink application process using flexographic printing, flood coating, tinting, or other suitable technique or process to add a color layer on top of a thermal ink layer of a material. This additional color provides a background color, such that the thermal image appears, upon application of the heat source, as being imaged onto the background color.

The process of the present invention may find a variety of uses on various thermal materials, and finds particular use in connection with the manufacture of heat-sensitive direct thermal labels or the manufacture of thermal paper rolls, including cash register-type rolls, poster printer format rolls, and any size rolls therebetween.

The process of the present invention allows two or more colors to be provided in direct thermal printing applications, as opposed to traditional one-color imaging. The present invention offers a variety of different background color choices to be provided to thermal-inked material in relatively small print runs by print shops having conventional equipment.

BRIEF DESCRIPTION OF THE DRAWINGS

The foregoing, as well as other objects of the present invention, will be further apparent from the following detailed description of the preferred embodiment of the invention, when taken together with the accompanying specification and the drawings, in which.

DESCRIPTION OF THE PREFERRED EMBODIMENT

Figure 1:
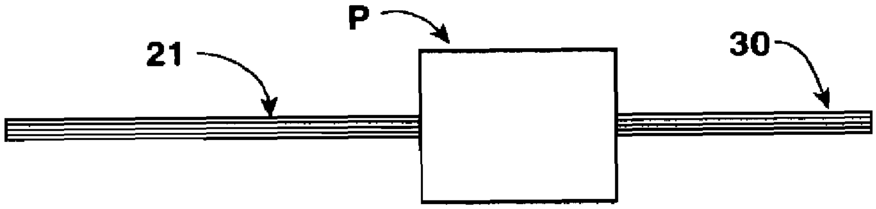
FIG. 1 is a schematic representation of the process of the present invention.

The accompanying drawings and the description which follows set forth this invention in its preferred embodiment. However, it is contemplated that persons generally familiar with thermal paper and printing techniques will be able to apply the novel characteristics of the processes and structures illustrated and described herein in other contexts by modification of certain details. Accordingly, the drawings and description are not to be taken as restrictive on the scope of this invention, but are to be understood as broad and general teachings.

Referring now to the drawings in detail, wherein like reference characters represent like elements or features throughout the various views, the process of the present invention for creating background colors on thermal material is indicated generally in the figures by reference character 10.

Figure 3:
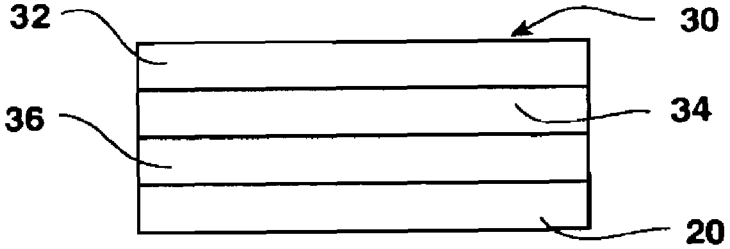
FIG. 3 is a cross-sectional view of a product produced by the process of the present invention.

A shown in FIG. 1, the process 10 of the present invention includes, in one preferred embodiment, a printing or coating application system, generally P, which is used to apply a dye resin layer 32 to a thermal ink layer 34 (FIG. 3) of a thermal material 21.

Figure 2:
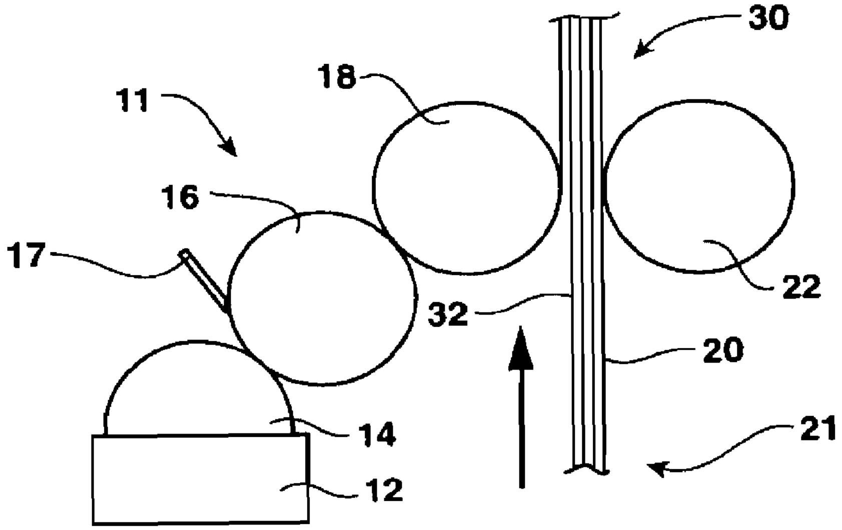
FIG. 2 is a schematic representation of the process of the present invention using a flexographic printing apparatus.

System P, in one preferred embodiment, is a flexographic press print station, generally 11, shown in FIG. 2, and includes an ink pan 12 for holding a dye resin ink. A fountain roll 14 picks up ink from ink pan 12 and transfers it to an anilox roll 16, the ink being metered and/or cleaned by a doctor blade 17. Anilox roll 16 transfers the ink to a plate cylinder 18, which prints the ink onto a substrate, or stock, 20, which contacts impression cylinder 22.

A process such as flexographic printing or flood coating capable of printing the dye resin ink is used to print up to the entire width of the substrate 20 being printed or coated. The flexographic press can include one or more stations 11, each station 11 including an anilox roll and the capability to apply a particular color to substrate 20. Accordingly, the more stations 11 the flexographic press has, the more colors which can be applied at one time. The number of stations 11 used could thus depend on the particular colors or color combinations desired, thereby offering increased flexibility in production of the coated material 30.

Because most thermal printers are software driven, ink can be applied to specific locations on substrate 20, if desired, to identify or represent specific information on such locations for the end user. The software can be coded to print in those locations or areas on substrate 20 as needed.

Using flexographic printing, the dye resin ink is printed on top of a thermal material 21 which has already been thermal-coated. This process provides a variety of background color options, limited only by the colors of inks available. Through use of several anilox rolls 16 and ink stations 11, various ink colors can be applied at one time, thereby offering many color options. For instance, if an end user required paper with a black image appearing on a yellow background, such end user could potentially have such paper produced using a standard flexographic process by a printer for the quantity needed. The printer would purchase existing thermal coated material, or stock, 21 and print the background color on top of that stock 21. Additionally, if the end user required a specific label printed with a number of separate colors, so that a desired image would appear in one or more of the colored areas, the printer could typically provide that also.

Because thermal products are typically produced in large quantities due to economies of scale, producing small quantities of products with special or unique colors can be cost prohibitive. The process of the present invention allows a conventional flexographic printer to purchase as little or as much stock from a supplier as needed and print such stock based on a particular customer's requirements.

The inks used in one preferred embodiment are made from dye resin particles, which are more transparent than pigmented inks. Dye particles have smaller molecules than pigmented inks. Pigmented inks are generally more dense and have greater staying power, especially in sunlight. Dye particles ordinarily easily oxidize and fade in sunlight. Resins help coat the particles and help the ink to dry. When mixed with a resin, the dye particles adhere together at a greater strength, are more resistant to fading and oxidation, and remain translucent enough to allow the thermal imaging to come through. Because pigmented inks are much more dense, printing with such inks, even at a nominal strength, inhibits the thermal image from coming through.

The present invention includes, in one preferred embodiment, use of conventional thermal stock, which could be labels, cash register-type paper, or poster printer paper (such as the type used with Varitronics®-brand or Fujifilm® brand poster printer models).

In accordance with the present invention, ink produced with dye resin particles is used to apply a top coating or layer 32 to a conventional thermal material 21, having a thermal ink layer 34, which may be on top of a base layer 36, which is in turn on top of a substrate, or stock, 20, such as, but not limited to, paper, such as label paper stock, poster printer paper stock, cash register-typer paper stock, etc. Dye resin ink is preferably used because of its translucent nature, as compared to typical pigmented inks, which are much more dense. Dye resin inks are available in a variety of colors, including bright fluorescent colors.

Although other thermal materials could be used in conjunction with practicing the process 10 of the present invention, process 10 can be used on suitable thermal papers of the type manufactured by Appleton Papers, referenced as Alpha 800 2.4 or Alpha 900 3.4. However, it is to be understood that the present invention is not limited to such thermal papers, and that process 10 could be used on other thermal materials, and such term, "thermal material," as used herein, includes papers and substrates other than paper, such as plastics, films, fabrics, metals, polymers, foils, and other suitable materials.

As noted above, pigmented inks are generally more dense than dyes, since dye particles have smaller molecules than pigmented inks. Ordinarily, typical pigmented inks would block or inhibit the thermal image from appearing a pigmented ink layer. However, it is to be understood that if pigmented inks are reduced in strength, or diluted, it is anticipated that such reduced pigmented inks could also be used in practicing the method of the present invention instead of, or in addition to, using dye resin inks. By sufficiently reducing the strength or density of the colored pigment in pigmented inks, light color shading of the thermal paper is achievable, and thermal imaging should appear through the reduced pigmented inks in a manner similar to thermal imaging produced using dye resin inks.

While preferred embodiments of the invention have been described using specific terms, such description is for present illustrative purposes only, and it is to be understood that changes and variations to such embodiments, including but not limited to the substitution of equivalent features or parts, and the reversal of various features thereof, may be practiced by those of ordinary skill in the art without departing from the spirit or scope of the present disclosure.

The invention claimed is:

1. A material for use in a thermal printing application, said material comprising:

a substrate;

a dye ink layer;

a thermal ink layer between said dye ink layer and said substrate;

wherein said thermal ink layer appears invisible prior to application of heat thereto and produces an image of a first color upon application of heat thereto; and wherein said dye ink layer comprises at least one portion including a visible second color, said visible second color being translucent such that upon application of heat to said thermal ink layer, said image is visible through said dye ink layer.

2. The material of claim 1, wherein said dye ink layer comprises a plurality of portions, each portion including said visible second color.

3. The material of claim 1, wherein said visible second color comprises a fluorescent color.

4. The material of claim 1, wherein said substrate comprises at least one of a plastic, metal, or polymer.

5. The material of claim 1, wherein said substrate comprises at least one film, fabric, or a foil.

6. The material of claim 1, wherein said substrate is paper.

7. The material of claim 1, wherein said substrate is an adhesive label.

8. The material of claim 1, wherein said substrate is a printable poster.

9. The material of claim 1, wherein said substrate is printable cash-register paper.

10. A material for use in a thermal printing application, said material comprising:

a substrate;

a pigmented ink layer;

a thermal ink layer between said pigmented ink layer and said substrate;

wherein said thermal ink layer appears invisible prior to application of heat thereto and produces an image of a first color upon application of heat thereto; and wherein said pigmented ink layer comprises at least one portion including a visible second color, said visible second color being fluorescent and translucent such that upon application of heat to said thermal ink layer, said image is visible through said pigmented ink layer.

11. The material of claim 10, wherein said pigmented ink layer comprises a plurality of portions, each portion including said visible second color.

12. The material of claim 10, wherein said substrate comprises at least one of a plastic, metal, or polymer.

13. The material of claim 10, wherein said substrate comprises at least one film, fabric, or a foil.

14. The material of claim 10, wherein said substrate is paper.

15. The material of claim 10, wherein said substrate is an adhesive label.

16. The material of claim 10, wherein said substrate is a printable poster.

17. The material of claim 10, wherein said substrate is printable cash-register paper.

* * * * *